United States Patent Office 2,840,553
Patented June 24, 1958

2,840,553

METHOD OF PREPARING CAPROLACTAM

Josef Heinrich Fritz Pieper, Berlin-Lichterfelde-West, Germany, assignor, by mesne assignments, to Hercules Powder Company, Wilmington, Del., a corporation of Delaware No Drawing. Application March 29, 1956
Serial No. 574,606

Claims priority, application Germany
November 23, 1955

4 Claims. (Cl. 260—239.3)

This invention relates to the preparation of lactams and more particularly to the preparation of pure $\epsilon$-caprolactam.

It is known to prepare lactams by rearrangement of cyclic oxime compounds or by reacting the corresponding $\omega$-hydroxy-carboxylic, $\omega$-halogen carboxylic and $\omega$-amino-carboxylic acids with ammonium hydroxide.

In accordance with this invention, $\epsilon$-caprolactam is prepared in a simple manner and in good yield by reacting $\epsilon$-hydroxycaproic acid amide or the ammonium salt of $\epsilon$-hydroxycaproic acid in aqueous ammoniacal solution at elevated temperatures and pressure.

The present invention is of very special importance in affording an attractive route to caprolactam in that the starting materials, that is, the amide or ammonium salt of $\epsilon$-hydroxycaproic acid, may be obtained by processing the reaction products from cyclohexane oxidation and by subsequently reacting such products in aqueous ammonia-containing solution to form $\epsilon$-caprolactam. The starting materials resulting from the oxidation reaction may be selected for the subsequent reaction with ammonia. Thus, the starting material may consist of $\epsilon$-hydroxycaproic acid amide, ammonium salt of $\epsilon$-hydroxycaproic acid, and mixtures thereof.

The method of this invention may be carried out continuously by heating the aqueous ammonia-containing solution of amide or ammonium salt to a high temperature under pressure for a sufficient period of time and by isolating the lactam from the resulting reaction product in the customary manner, and if desired, using continuous extraction methods. That portion of the starting product that is unreacted will remain in the aqueous ammonia-containing solution and when continuous processing is employed, the solution may be recycled.

The following examples serve to illustrate the invention.

*Example 1*

Three parts by weight of $\epsilon$-hydroxycaproic acid amide are dissolved in 30 parts by weight of 30% aqueous ammonium hydroxide and are heated in a shaking autoclave over a period of 10 hours to 290 to 300° C. At this temperature the pressure in the autoclave will rise to 145 to 150 atmospheres gage. Upon completion of the reaction the reaction mixture is completely extracted with chloroform. Small quantities of the starting product that did not enter the reaction will remain in the aqueous ammonia-containing solution, whereas the $\epsilon$-caprolactam will be obtained in pure form from the chloroform solution by evaporation of the solvent and fractional vacuum distillation. The yield of $\epsilon$-caprolactam in this reaction amounts to 2.2 parts by weight, corresponding to 85% of the theoretical yield.

*Example 2*

Three parts by weight of ammonium salt of $\epsilon$-hydroxycaproic acid are dissolved in 30 parts by weight of 30% aqueous ammonium hydroxide. This solution is heated for 10 hours in a shaking autoclave to a temperature of about 290° C. raising the pressure therein to 150 atmospheres gage. Upon completion of the reaction the solution is extracted with chloroform. Ammonium salt that did not react will remain in the aqueous phase, whereas the $\epsilon$-caprolactam is obtained in pure form from the solvent phase by evaporation of the chloroform and fractional vacuum distillation. The yield amounts to 1.9 parts by weight of $\epsilon$-caprolactam corresponding to 82% of the theoretical yield.

As the above examples illustrate, the invention provides for the production of a pure form of $\epsilon$-caprolactam, that is, having a melting point in the order of 69° C. Moreover, it will be seen that the reactions carried out in aqueous ammonia solution under conditions of superatmospheric pressure and temperature gave satisfactory results in respect to purity and yield of caprolactam. The most favorable temperature range for the reaction was found to be from about 250 to about 300° C.

What I claim and desire to protect by Letters Patent is:

1. The method of preparing $\epsilon$-caprolactam comprising reacting a material of the group consisting of $\epsilon$-hydroxycaproic acid amide, ammonium salt of $\epsilon$-hydroxycaproic acid, and mixtures thereof, in aqueous ammonia solution under conditions of superatmospheric pressure and temperature from about 250° C. to about 300° C.

2. The method of preparing $\epsilon$-caprolactam comprising reacting $\epsilon$-hydroxycaproic acid amide in aqueous ammonia solution under conditions of superatmospheric pressure and temperature from about 250° C. to about 300° C.

3. The method of preparing $\epsilon$-caprolactam comprising reacting ammonium salt of $\epsilon$-hydroxycaproic acid in aqueous ammonia solution under conditions of superatmospheric pressure and temperature from about 250° C. to about 300° C.

4. The method of preparting $\epsilon$-caprolactam comprising reacting a mixture of $\epsilon$-hydroxycaproic acid amide and ammonium salt of $\epsilon$-hydroxycaproic acid in aqueous ammonia solution under conditions of superatmospheric pressure and temperature from about 250° C. to about 300° C.

References Cited in the file of this patent

UNITED STATES PATENTS

| | | |
|---|---|---|
| 2,250,468 | Cockerille | July 29, 1941 |
| 2,301,964 | Martin | Nov. 17, 1942 |
| 2,357,484 | Martin | Sept. 5, 1944 |
| 2,364,538 | Kirk et al. | Dec. 5, 1944 |
| 2,439,359 | Dixon | Apr. 6, 1948 |